United States Patent
Chen et al.

(10) Patent No.: US 9,348,071 B2
(45) Date of Patent: May 24, 2016

(54) MINIATURIZED OPTICAL SYSTEM, LIGHT SOURCE MODULE AND PORTABLE ELECTRONIC DEVICE

(71) Applicant: PixArt Imaging Inc., Hsin-Chu (TW)

(72) Inventors: Hui-Hsuan Chen, Hsin-Chu (TW); Tien-Chia Liu, Hsin-Chu (TW); Wen-Yen Su, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 196 days.

(21) Appl. No.: 13/974,662

(22) Filed: Aug. 23, 2013

(65) Prior Publication Data

US 2014/0084134 A1 Mar. 27, 2014

(30) Foreign Application Priority Data

Sep. 26, 2012 (TW) .............................. 101135473 A

(51) Int. Cl.
| | |
|---|---|
| *G01V 8/10* | (2006.01) |
| *G01V 8/12* | (2006.01) |
| *G02B 5/28* | (2006.01) |
| *G01J 1/08* | (2006.01) |
| *G06F 3/03* | (2006.01) |

(52) U.S. Cl.
CPC ... *G02B 5/28* (2013.01); *G01J 1/08* (2013.01); *G01V 8/10* (2013.01); *G01V 8/12* (2013.01); *G06F 3/0304* (2013.01); *G06F 3/0317* (2013.01)

(58) Field of Classification Search
USPC ............... 250/221, 231.1, 549; 345/173–178; 340/545.3, 555–557
See application file for complete search history.

(56) References Cited

U.S. PATENT DOCUMENTS

| | | | |
|---|---|---|---|
| 2007/0070494 A1* | 3/2007 | Brott et al. ..................... | 359/357 |
| 2008/0284925 A1 | 11/2008 | Han | |
| 2012/0132809 A1* | 5/2012 | Findlay .......................... | 250/353 |
| 2013/0075595 A1* | 3/2013 | Ruh ............................... | 250/221 |

FOREIGN PATENT DOCUMENTS

| | | |
|---|---|---|
| TW | 589489 B | 6/2004 |
| TW | I256593 B | 6/2006 |
| TW | 201218032 A | 5/2012 |

* cited by examiner

*Primary Examiner* — Renee D Chavez
(74) *Attorney, Agent, or Firm* — Hauptman Ham, LLP

(57) ABSTRACT

There is provided a miniaturized optical system including a protection cover, a light source, an image sensor and at least one interference film. The protection cover has a first surface and a second surface. The light source and the image sensor are disposed opposite to the first surface of the protection cover. The interference film is disposed between the light source and the protection cover to allow the light source to form a predetermined light shape in front of the second surface of the protection cover and/or disposed between the image sensor and the protection cover to allow the image sensor to receive light of a predetermined range in front of the second surface of the protection cover.

17 Claims, 3 Drawing Sheets

MINIATURIZED OPTICAL SYSTEM, LIGHT SOURCE MODULE AND PORTABLE ELECTRONIC DEVICE

CROSS REFERENCE TO RELATED APPLICATION

This application claims the priority benefit of Taiwan Patent Application Serial Number 101135473, filed on Sep. 26, 2012, the full disclosure of which is incorporated herein by reference.

BACKGROUND

1. Field of the Disclosure

This disclosure generally relates to an optical system and, more particularly, to a miniaturized optical system and a portable electronic device capable of controlling the illumination light shape and the detection field of view.

2. Description of the Related Art

With the smart phone products becoming more diverse, the user-friendly operation and the power saving have always been important issues. For example, the gesture recognition function may be applied to the smart phone so as to improve operable functions and the operational convenience. The proximity detection function may also be applied to the smart phone in order to save power by disabling the screen when the user is answering an incoming call. These functions are generally implemented by employing a light source and an image sensor configured to detect reflected light of the light source.

For example, FIG. 1 shows the conventional optical system that is used to implement functions of the gesture recognition and the proximity detection. The conventional optical system 9 includes a light source 91, a sensor 92 and a glass cover 93. The light source 91 is configured to illuminate an object in front of the glass cover 93 to allow the object to generate reflected light. The sensor 92 is configured to detect the reflected light from the object so as to accordingly perform the gesture detection or the proximity detection.

However, a part of light emitted from the light source 91 may be reflected by total reflection inside the glass cover 93, e.g. a light beam 911, or directly reflected by the surface of the glass cover 93, e.g. a light beam 912, and directly received by the sensor 92 without passing through the glass cover 93 thereby causing interference to the image outputted by the sensor 92. Therefore, conventionally in order to eliminate the interference from stray light, e.g. the light beams 911 and 912, a secondary optics lens 94 is arranged in front of the light source 91 or the sensor 92 so as to adjust the illumination light shape and the detection field of view. However, the secondary optics lens 94 has a larger thickness and is difficult to be miniaturized, especially not following the trend of miniaturization of portable electronic devices nowadays.

Accordingly, the present disclosure further provides a miniaturized optical system and a portable electronic device that may control the illumination light shape and the detection field of view according to the designation so as to fulfill the requirement of miniaturization and low cost.

SUMMARY

The present disclosure provides a miniaturized optical system and a portable electronic device that may achieve the object of controlling the illumination light shape and the detection field of view based on the physical property of the interference film that has a spectrum shift with different light incident angles.

The present disclosure further provides a light source module that may form an illumination range with a predetermined illumination light shape through an interference film.

The present disclosure provides a miniaturized optical system including a protection cover, a light source, an image sensor and at least one interference film. The protection cover has a first surface and a second surface. The light source and the image sensor are disposed opposite to the first surface of the protection cover. The at least one interference film is disposed between the light source and the protection cover to allow the light source to form a predetermined light shape in front of the second surface of the protection cover through the interference film and/or between the image sensor and the protection cover to allow the image sensor to receive light of a predetermined range in front of the second surface of the protection cover through the interference film.

The present disclosure further provides a light source module including protection cover, a light source and an interference film. The protection cover has a first surface and a second surface. The light source is disposed opposite to the first surface of the protection cover. The interference film is disposed between the protection cover and the light source to allow the light source to form a predetermined light shape in front of the second surface of the protection cover through the interference film.

The present disclosure further provides a portable electronic device including a protection cover, a light source, an image sensor, a lens and at least one interference film. The protection cover has a first surface and a second surface. The light source is disposed opposite to the first surface of the protection cover and configured to illuminate an object in front of the second surface. The image sensor is disposed opposite to the first surface of the protection cover and configured to receive reflected light from the object. The lens is disposed between the image sensor and the protection cover. The at least one interference film is disposed between the light source and the protection cover and/or between the lens and the protection cover.

In one aspect, the interference film includes a substrate and a coating layer, wherein the substrate may be a glass substrate or a plastic substrate.

In one aspect, a first interference film is disposed between the light source and the protection cover, wherein the first interference film includes a first coating layer formed on a surface of the first interference film facing the protection cover.

In one aspect, a second interference film is disposed between the image sensor and the protection cover, wherein the second interference film includes a second coating layer formed on a surface of the second interference film facing the image sensor or the lens.

In one aspect, the interference film may form a bandpass filter or a cut filter.

In the miniaturized optical system, the light source module and the portable electronic device according to the embodiment of the present disclosure, as the transmittance spectrum of the interference film has the physical property of having a spectrum shift with the light incident angle, it can be used to limit the penetration angle of a fixed light source spectrum so as to block stray light having a large incident angle, wherein the incident angle is an angle incident to the interference film.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
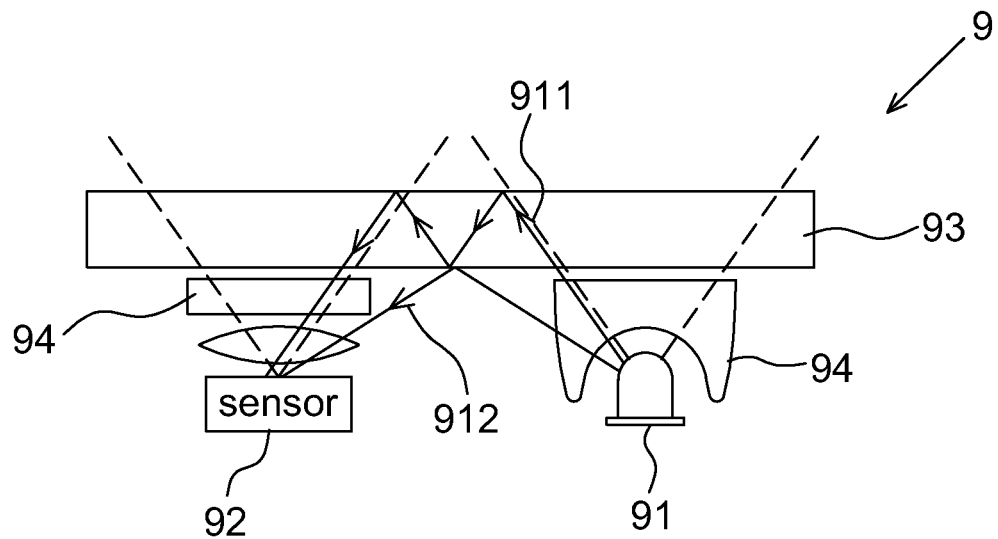
FIG. 1 shows a schematic diagram of the conventional optical system.
Figure 2:
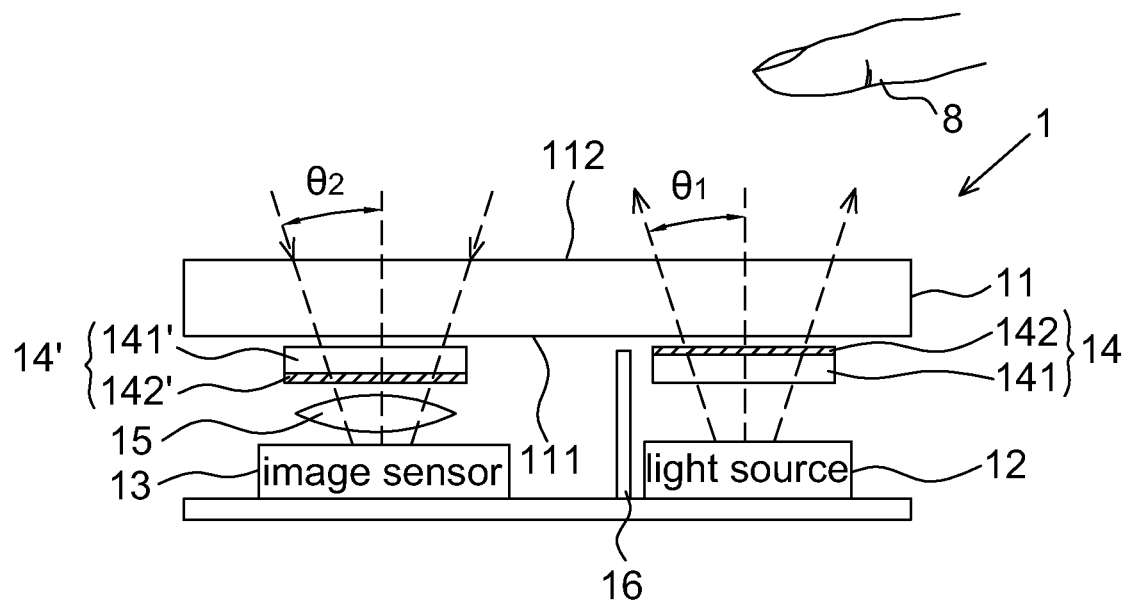
FIG. 2 shows a schematic diagram of the miniaturized optical system according to an embodiment of the present disclosure.

Referring to FIG. 2, it shows a schematic diagram of the miniaturized optical system 1 according to an embodiment of the present disclosure, which includes a protection cover 11, a light source 12, an image sensor 13, at least one interference film (e.g. two interference films 14 and 14' are shown herein) and a lens 15. The miniaturized optical system 1 according to the embodiment of the present disclosure may be a proximity sensing device, a gesture recognition device, an optical finger mouse or the like that may be adapted to a portable electronic device, e.g. a cell phone, a tablet computer, a notebook computer, a personal digital assistance (PDA) and so on, for detecting the motion of an object 8 with respect to the miniaturized optical system 1. In addition, the miniaturized optical system 1 may further be adapted to other stationary electronic devices, e.g. a monitor system, without particular limitation as long as it is an electronic device including a light source configured to illuminate an object and an image sensor configured to receive reflected light from the object. The present disclosure is to use the interference principle of the interference film, e.g. 14 and 14', to control a predetermined illumination light shape of the light source 12 and a predetermined detection field of view of the image sensor 13. In other embodiments, the miniaturized optical system 1 may further include a block member 16 disposed between the light source 12 and the image sensor 13, and the block member 16 is configured to prevent the light emitted by the light source 12 from being received by the image sensor 13 directly, wherein the block member 16 may be an opaque member or a hollowed transparent member. The block member 16 may not be implemented according to different applications.

In the descriptions below, the descriptions are made by applying the miniaturized optical system 1 to a portable electronic device. However as mentioned above, the application of the miniaturized optical system 1 is not limited to portable electronic devices.

The protection cover 11 has a first surface 111 (e.g. the lower surface in the figure) and a second surface 112 (e.g. the upper surface in the figure). The protection cover 11 may be a glass cover, a plastic cover or any cover that is transparent to the light emitted by the light source 12. The protection cover 11 is configured to protect the components disposed at an inner side (e.g. the side of the first surface 11) of the protection cover 11 and to prevent dust from entering the inner side. The protection cover 11 may be a part of a housing of the portable electronic device, but the protection cover 11 may be formed separately from the housing.

The light source 12 is preferably a light emitting diode and may be disposed opposite to the first surface 111 of the protection cover 11. The light source 12 is configured to illuminate an object 8, e.g. a finger, other parts of the human body or a touch member according to the application, in front of the second surface 112 of the protection cover 11. In one embodiment, the light source 12 may emit infrared light having a center wavelength of 850 nm or 940 nm It should be mentioned that the wavelength mentioned herein is only intended to illustrate but not to limit the present disclosure. In other embodiments, the light source 12 may emit visible light or invisible light of suitable wavelength according to the application.

The image sensor 13 may be a CCD image sensor, a CMOS image sensor or other optoelectronic devices configured to convert optical signals to electronic signals. The image sensor 13 may be disposed opposite to the first surface 111 of the protection cover 11 and is configured to receive reflected light from the object 8. The image sensor 13 may capture the reflected light at a sampling frequency to output image frames to a processing unit (not shown) for post-processing. Functions of the processing unit controlling electronic devices according to the processed results are well known and thus details thereof are not described herein.

The lens 15 may be a single lens or a lens set and is disposed between the image sensor 13 and the protection cover 11. The lens 15 is configured to determine a field of view of the image sensor 13.

A first interference film 14 may be disposed between the light source 12 and the protection cover 11 to allow the light source 12 to form a predetermined light shape, e.g. an illumination range having an emission angle $2\theta_1$ herein, in front of the second surface 112 of the protection cover 11 through the first interference film 14, wherein the first interference film 14 may include a substrate 141 and a first coating layer 142. As the first interference film 14 has an extremely small thickness (e.g. lower than 0.4 mm), the first coating layer 142 is preferably formed on a surface of the substrate 141 of the first interference film 14 facing the protection cover 11 so as to increase the illumination range having the emission angle $2\theta_1$ as much as possible.

A second interference film 14' may be disposed between the image sensor 13 and the protection cover 11 to allow the image sensor 13 to receive light of a predetermined range, e.g. a detection range having a detection field of view $2\theta_2$ herein, in front of the second surface 112 of the protection cover 11 through the second interference film 14', wherein the second interference film 14' may include a substrate 141' and a second coating layer 142'. As the second interference film 14' has an extremely small thickness (e.g. lower than 0.4 mm), the second coating layer 142' is preferably formed on a surface of the substrate 141' of the second interference film 14' facing the image sensor 13 so as to increase the detection range having the detection field of view $2\theta_2$ as much as possible. In one embodiment, the second interference film 14' is preferably disposed between the lens 15 and the protection cover 11 so as to limit the incident angle of light before the light enters the lens 15 thereby preventing the stray light having a large incident angle from reaching the lens 15. In this case, the second coating layer 142' is preferably formed on a surface of the substrate 141' of the second interference film 14' facing the lens 15.

In this embodiment, it is able to implement one or both of the first interference film 14 and the second interference film 14'. The first interference film 14 is configured to limit the illumination light shape generated by the light source 12 and the second interference film 14' is configured to limit the detection range of the image sensor 13. As the first interference film 14 and the second interference film 14' have different effects, if both of them are implemented, it is able to effectively prevent the image sensor 13 from receiving the stray light. In this embodiment, the substrates 141, 141' may be a glass substrate or a plastic substrate without particular limitation as long as it is a substrate capable of being used to manufacture the interference film by forming a coating layer on one surface thereof.

Figure 3A:
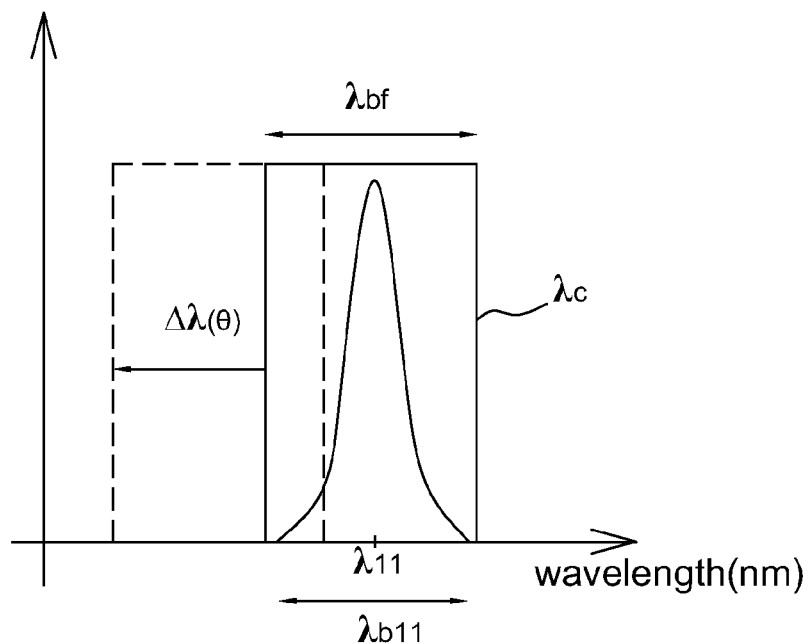
FIG. 3A shows an operational schematic diagram of the interference film which forms a bandpass filter.

Referring to FIG. 3A, it shows an operational schematic diagram of an interference film, wherein the interference films 14, 14' may be formed as a bandpass filter. Herein it is assumed that the light emitted by the light source 12 has a center wavelength $\lambda_{11}$ and a wavelength range $\lambda_{b11}$, e.g. $\lambda_{11}-5$ nm$\leq\lambda_{b11}\leq\lambda_{11}+5$ nm, but not limited to. The interference films 14, 14' may have a transmittance wavelength range $\lambda_{bf}$ and a cutoff wavelength $\lambda_c$. It is appreciated that the transmittance wavelength range $\lambda_{bf}$ preferably covers the wavelength range $\lambda_{b11}$. In FIG. 3A the transmittance wavelength range $\lambda_{bf}$ shown by the solid line is assumed to be the case when an incident angle of light with respect to the interference films 14, 14' is zero (e.g. $\theta_1=0$ or $\theta_2=0$). When the incident angle increases, the transmittance wavelength range $\lambda_{bf}$ moves toward one side, e.g. moving leftward to the part shown by the dashed line. When the cutoff wavelength $\lambda_c$ exceeds or is going to exceed the wavelength range $\lambda_{b11}$ due to the increase of the incident angle, the light is not able to pass through the interference films 14, 14' such that the incident angle is limited within a predetermined range thereby achieving the object of controlling the illumination light shape of the light source 12 and the detection field of view of the image sensor 13. In this embodiment, the shift rate $\Delta\lambda(\theta)$ of the transmittance wavelength range $\lambda_{bf}$ with respect to the light incident angle may be controlled in manufacturing the interference films 14, 14'. For example, the shift rate $\Delta\lambda(\theta)$ may be arranged as 0.5 nm/degree to 1.5 nm/degree to accordingly control the illumination light shape (e.g. the incident angle $\theta_1$) and the detection field of view (e.g. incident angle $\theta_2$). In one embodiment, the cutoff wavelength $\lambda_c$ may be 880 nm or 970 nm, but not limited thereto, and its actual value may be determined according to the incident angle to be controlled as well as the center wavelength of the light source.

Figure 3B:
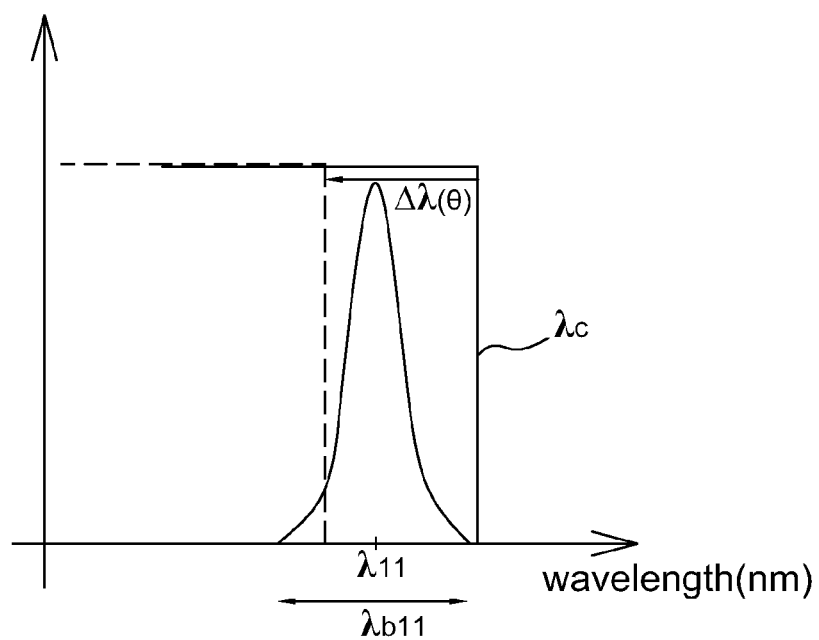
FIG. 3B shows another operational schematic diagram of the interference film which forms a cut filter.

Referring to FIG. 3B, it shows another schematic diagram of the interference film, wherein the interference films 14, 14' may be formed as a cut filter having a cutoff wavelength $\lambda_c$. In FIG. 3B, when an incident angle of light is zero (e.g. $\theta_1=0$ or $\theta_2=0$), the transmittance wavelength range $\lambda_{bf}$ of the interference films 14, 14' covers the wavelength range $\lambda_{b11}$ of the light source 12. When the incident angle increases, the transmittance wavelength range $\lambda_{bf}$ also moves toward one side (e.g. leftward herein) based on $\Delta\lambda(\theta)$. When the cutoff wavelength $\lambda_c$ exceeds or is going to exceed the wavelength range $\lambda_{b11}$ due to the increase of the incident angle, the light is not able to pass through the interference films 14, 14'.

In addition, in order to prevent the transmittance angle range (e.g. $2\theta_2$) of the second interference film 14' from limiting the field of view of the lens 15, the transmittance angle range preferably matches the field of view of the lens 15. As mentioned above, the transmittance angle range may be controlled in manufacturing the second interference film 14' to allow the light exceeding a predetermined incident angle not able to pass through the second interference film 14'.

In another embodiment, the present disclosure further provides a light source module that defines an illumination light shape by using an interference film. For example, if only the light source part (i.e. the right part) in FIG. 2 is considered, the light source module according to the embodiment of the present disclosure may include a protection cover 11, a light source 12 and an interference film 14. The protection cover 11 has a first surface 111 and a second surface 112. The light source 12 may be disposed opposite to the first surface 111 of the protection cover 11. The interference film 14 is disposed between the protection cover 11 and the light source 12 to allow the light source 12 to form a predetermined light shape in front of the second surface 112 of the protection cover 11 through the interference film 14, e.g. the illumination range $2\theta_1$. According to the spectrum shift of the interference film 14 (e.g. as shown in FIGS. 3A and 3B), the incident light exceeding the predetermined incident angle is not able to pass through the interference film 14 so as to define the illumination range $2\theta_1$.

Similarly, the interference film 14 may be manufactured by forming a coating layer 142 on a substrate 141 (e.g. a glass substrate or a plastic substrate), and the coating layer 142 is preferably formed on a surface of the interference film 14 facing the protection cover 11 so as to increase the illumination range $2\theta_1$ as much as possible. Similarly, the interference film 14 may also be formed as a bandpass filter or a cut filter, and the bandwidth and cutoff wavelength thereof may be designed in cooperation with the center wavelength and the emission bandwidth of the light source 12 without particular limitation.

Figure 4:
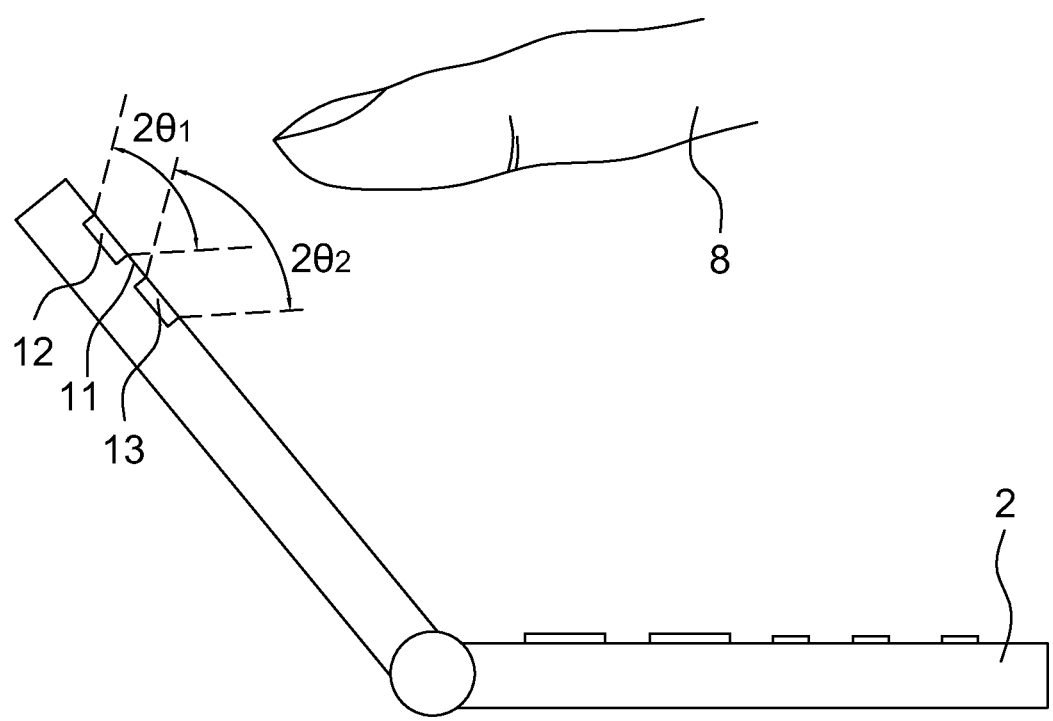
FIG. 4 shows a schematic diagram of the portable electronic device to which the miniaturized optical system according to the embodiment of the present disclosure applied.

Referring to FIG. 4, when the miniaturized optical system 1 according to the embodiment of the present disclosure is applied to a portable electronic device 2, a predetermined light shape may be formed in front of the light source 12 (e.g. the illumination range $2\theta_1$) and a detection field of view of the image sensor 13 may be determined (e.g. the detection range $2\theta_2$) so as to prevent the image sensor 13 from receiving the stray light directly from the light source 12 thereby increasing the image quality of the image frame captured by the image sensor 13.

As mentioned above, as the conventional optical system uses the secondary optics lens to adjust the light shape, it has the miniaturization problem. Therefore, the present disclosure further provides a miniaturized optical system (FIG. 2), a light source module and a portable electronic device (FIG. 4) that may achieve the object of controlling the illumination light shape and the detection field of view by using the spectrum shift of the interference film. The thickness of the interference film may be smaller than that of the protection cover so as to fulfill the requirement of miniaturization and low cost.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A miniaturized optical system, comprising:
a protection cover having a first surface and a second surface;
a light source opposite to the first surface of the protection cover;
an image sensor opposite to the first surface of the protection cover; and
at least one of a first interference film and a second interference film,
the first interference film disposed between the light source and the protection cover to allow the light source to form a predetermined light shape in front of the second surface of the protection cover through the first interference film, wherein the first interference film comprises
- a first substrate which has a first side facing the protection cover and a second side facing the light source, and
- a first coating layer formed on the first side of the first substrate but not formed on the second side of the first substrate, and the second interference film disposed between the image sensor and the protection cover to allow the image sensor to receive light of a predetermined range in front of the second surface of the protection cover through the second interference film, wherein the second interference film comprises
- a second substrate which has a first side facing the protection cover and a second side facing the image sensor, and
- a second coating layer formed on the second side of the second substrate but not formed on the first side of the second substrate, wherein a transmittance wavelength range of the first and second interference films has a predetermined shift rate in wavelengths with respect to incident angles of light impinging on the first and second interference films.

2. The miniaturized optical system as claimed in claim 1, wherein each of the first and second substrates is a glass substrate or a plastic substrate.

3. The miniaturized optical system as claimed in claim 1, further comprising a lens between the protection cover and the image sensor.

4. The miniaturized optical system as claimed in claim 3, wherein the second interference film is between the lens and the protection cover.

5. The miniaturized optical system as claimed in claim 1, which is a proximity sensing device or a gesture recognition device.

6. The miniaturized optical system as claimed in claim 1, wherein the light source is configured to emit invisible light.

7. The miniaturized optical system as claimed in claim 1, wherein each of the first and second interference films forms a bandpass filter or a cut filter.

8. The miniaturized optical system as claimed in claim 1, further comprising a block member between the light source and the image sensor, wherein the block member is configured to block light emitted by the light source.

9. The miniaturized optical system as claimed in claim 1, comprising both the first interference film and the second interference film.

10. A light source module, comprising:
- a protection cover having a first surface and a second surface;
- a light source opposite to the first surface of the protection cover; and
- an interference film disposed between the protection cover and the light source to allow the light source to form a predetermined light shape in front of the second surface of the protection cover through the interference film, wherein the interference film comprises
  - a substrate which has a first side facing the protection cover and a second side facing the light source, and
  - a coating layer formed on the first side of the substrate but not formed on the second side of the substrate, wherein a transmittance wavelength range of the interference film has a predetermined shift rate in wavelengths with respect to incident angles of light impinging on the interference film.

11. The light source module as claimed in claim 10, wherein the substrate is a glass substrate or a plastic substrate.

12. The light source module as claimed in claim 10, wherein the interference film forms a bandpass filter or a cut filter.

13. A portable electronic device, comprising:
- a protection cover having a first surface and a second surface;
- a light source disposed opposite to the first surface of the protection cover and configured to illuminate an object in front of the second surface;
- an image sensor disposed opposite to the first surface of the protection cover and configured to receive reflected light from the object;
- a lens between the image sensor and the protection cover; and
- at least one of a first interference film and a second interference film,
  - the first interference film disposed between the light source and the protection cover, wherein the first interference film comprises
    - a first substrate which has a first side facing the protection cover and a second side facing the light source, and
    - a first coating layer formed on the first side of the first substrate but not formed on the second side of the first substrate, and
  - the second interference film disposed between the image sensor and the protection cover, wherein the second interference film comprises
    - a second substrate which has a first side facing the protection cover and a second side facing the image sensor, and
    - a second coating layer formed on the second side of the second substrate but not formed on the first side of the second substrate, wherein a transmittance wavelength range of the first and second interference films has a predetermined shift rate in wavelengths with respect to incident angles of light impinging on the first and second interference films.

14. The portable electronic device as claimed in claim 13, wherein each of the first and second substrates is a glass substrate or a plastic substrate.

15. The portable electronic device as claimed in claim 13, wherein each of the first and second interference films forms a bandpass filter or a cut filter.

16. The portable electronic device as claimed in claim 13, wherein the protection cover is a part of a housing of the portable electronic device.

17. The portable electronic device as claimed in claim 13, comprising both the first interference film and the second interference film.

* * * * *